(12) United States Patent
Awsienko et al.

(10) Patent No.: US 7,310,319 B2
(45) Date of Patent: Dec. 18, 2007

(54) MULTIPLE-DOMAIN PROCESSING SYSTEM USING HIERARCHICALLY ORTHOGONAL SWITCHING FABRIC

(75) Inventors: Oleg Awsienko, Phoenix, AZ (US); Edward Butler, Chandler, AZ (US); Gary L. McAlpine, Banks, OR (US); David B. Minturn, Hillsboro, OR (US); Joseph Schaefer, Chandler, AZ (US); Gary A. Solomon, Acton, MA (US)

(73) Assignee: Intel Corporation, Santa Clara, CA (US)

( * ) Notice: Subject to any disclaimer, the term of this patent is extended or adjusted under 35 U.S.C. 154(b) by 736 days.

(21) Appl. No.: 10/005,895

(22) Filed: Nov. 2, 2001

(65) Prior Publication Data

US 2003/0086421 A1 May 8, 2003

(51) Int. Cl.
 *H04L 12/28* (2006.01)
(52) U.S. Cl. ............... 370/254; 370/369; 370/375; 370/380; 370/400
(58) Field of Classification Search ........... 370/254, 370/389, 400, 401, 369, 375, 380
 See application file for complete search history.

(56) References Cited

U.S. PATENT DOCUMENTS 5,617,421 A 4/1997 Chin et al.
5,634,010 A 5/1997 Ciscon et al.
5,875,314 A 2/1999 Edholm ............... 710/317
6,182,178 B1 1/2001 Kelley et al. ............ 710/314
6,295,276 B1 9/2001 Datta et al. ............. 370/218
7,020,697 B1 * 3/2006 Goodman et al. ......... 709/223
2003/0103511 A1 * 6/2003 Tittanen et al. ........... 370/396

FOREIGN PATENT DOCUMENTS

| EP | 0410096 | 1/1991 |
|---|---|---|
| EP | 0868054 | 9/1998 |
| EP | 1111850 | 6/2001 |
| WO | WO-98/14014 | 4/1998 |
| WO | WO-9926163 A1 | 5/1999 |

OTHER PUBLICATIONS

Law, K.L., et al., "A large scalable ATM multicast switch", *IEEE Journal on Selected Areas in Communications, 15(5)*, (1997), 844-854.
Marcus, W. S., et al., "A CMOS Batcher and banyan chip set for B-ISDN", *1990 IEEE International Solid-State Circuits Conference, 1990. Digest of Technical Papers. 37th ISSCC.*, (1990), 32-33, 258.
Marcus, W. S., "A CMOS Batcher and Banyan chip set for B-ISDN packet switching", *IEEE Journal of Solid-State Circuits, 25(6)*, (1990), 1426-1432.

* cited by examiner

*Primary Examiner*—Joseph Field
*Assistant Examiner*—Inder Pal Mehra
(74) *Attorney, Agent, or Firm*—Ryder IP Law, PC; Douglas J. Ryder

(57) ABSTRACT

A multiple-domain processing system includes a multi-dimensional switching fabric to provide intra-domain and inter-domain communication within the system.

31 Claims, 5 Drawing Sheets

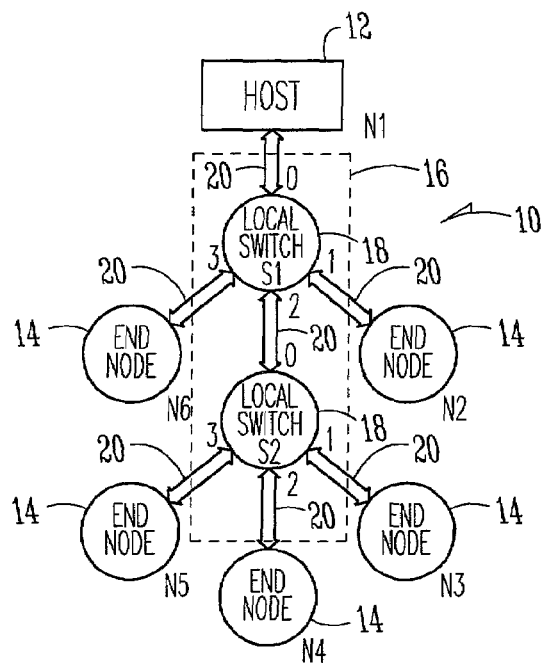
Fig. 1
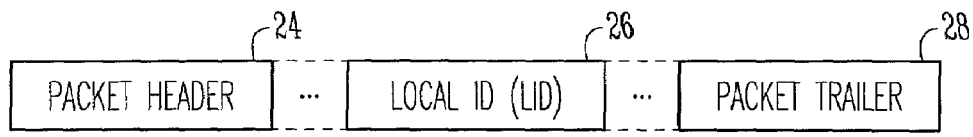
Fig. 2
| S1 LOCAL | | 
|---|---|
| NODE | PORT |
| N1 | 0 |
| N2 | 1 |
| N3 | 2 |
| N4 | 2 |
| N5 | 2 |
| N6 | 3 |
| S2 LOCAL | |
|---|---|
| NODE | PORT |
| N1 | 0 |
| N2 | 0 |
| N3 | 1 |
| N4 | 2 |
| N5 | 3 |
| N6 | 0 |
Fig. 3

MULTIPLE-DOMAIN PROCESSING SYSTEM USING HIERARCHICALLY ORTHOGONAL SWITCHING FABRIC

FIELD OF THE INVENTION

The invention relates generally to digital processing and, more particularly, to communication between peers within a multi-processor environment.

BACKGROUND OF THE INVENTION

In a typical processing domain, a host processor communicates with a number of end nodes through some form of interconnect. In the past, the interconnect was typically a bus (e.g., a peripheral component interconnect (PCI) bus). More recently, switching fabric has been used as an interconnection means between the host and the end nodes of a processing domain. Some examples of switching fabric technologies that may be used include 3GIO, Rapid I/O™, and HyperTransport™. In some applications (e.g., networking applications), the desire to perform dynamically distributed processing across a number of processing elements and/or redundant systems has generated a need for multiple-domain solutions. As can be appreciated, a multiple-domain system requires some mechanism for inter-domain communication. Prior techniques for providing inter-domain communication in a multiple-domain system (e.g., non-transparent bridging, multiple fabrics, flat addressing schemes, etc.) have been inadequate from a performance and/or capability standpoint. Therefore, there is need for enhanced methods and structures for providing communication between processing domains in a multiple-domain processing system.

BRIEF DESCRIPTION OF THE DRAWINGS

FIG. 1 is a block diagram illustrating a processing domain that utilizes switching fabric to provide communication between individual processing nodes therein;

FIG. 2 is a diagram illustrating a packet structure that may be used within the processing domain of FIG. 1;

FIG. 3 is a diagram illustrating a pair of lookup tables that may be used by local switches within the processing domain of FIG. 1;

DETAILED DESCRIPTION

Figure 4:
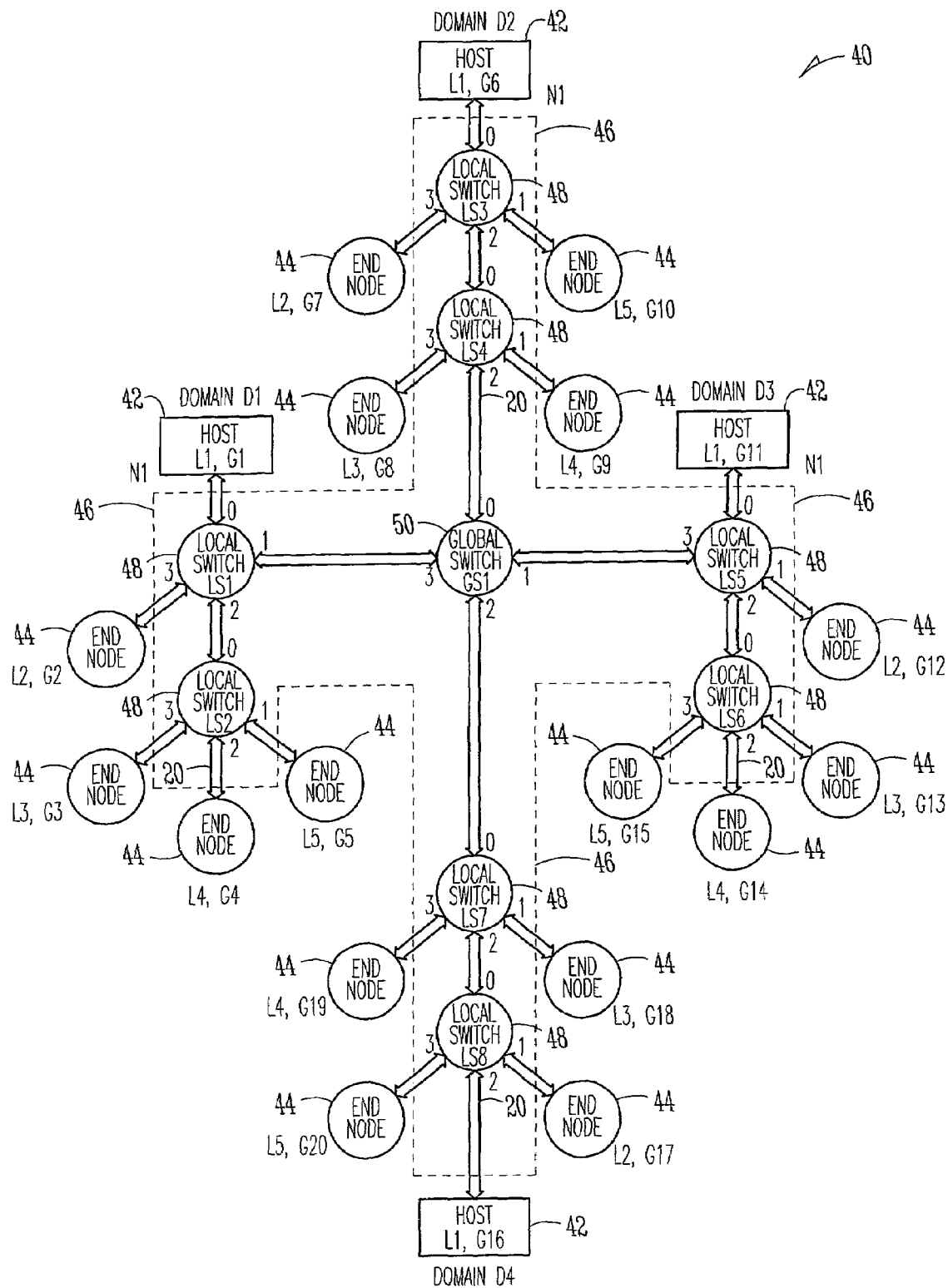
FIG. 4 is a block diagram illustrating a multiple-domain processing system in accordance with an embodiment of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

The present invention relates to methods and structures for providing communication between processing domains within a multiple-domain processing environment. Packets are routed in two or more orthogonal hierarchical planes to provide communication between nodes in a multi-domain system. A first plane (e.g., a local plane) may provide communication between processing nodes within individual domains. A second plane (e.g., a global plane) may provide communication between processing nodes in different domains. Global switches are provided to form a multi-dimensional switching fabric in the system. In contrast to systems using flat addressing schemes (e.g., systems using non-transparent bridges, multiples fabrics, etc.), the global switches impose little or no performance penalty on local traffic within a domain. Thus, overall performance is enhanced by the multi-dimensional nature of the switching fabric. Using the inventive principles, multi-dimensional switching fabrics having ultra-high extensibility are possible. In addition, the inventive principles may be employed to provide communication between processing domains that utilize different operating systems and/or different switching fabric technologies (e.g., Rapid I/O in one domain and 3GIO in another). As will be apparent to persons skilled in the art, the inventive principles may be used in a wide range of applications requiring communication between multiple processing domains.

FIG. 1 is a block diagram illustrating a processing domain 10 that utilizes switching fabric to provide communication between individual processing nodes therein. As illustrated, the processing domain 10 comprises: a host (N1) 12, a number of end nodes (N2–N6) 14, and switching fabric 16. The switching fabric 16 includes a pair of local switches (S1, S2) 18 and a number of point-to-point transmission segments 20. As will be appreciated, the number of end nodes 14, the number of local switches 18, and the configuration of the switching fabric 16 may vary from design to design. The switching fabric 16 provides data communication between the host 12 and the individual end nodes 14. In addition, the switching fabric 16 may also provide direct communication between individual end nodes 14 within the domain 10 without requiring intermediate processing by the host 12. In order to provide software transparency, the switching fabric 16 that is used within the domain 10 may mimic the attributes of a legacy bus-based solution (e.g., PCI). This may allow legacy bus software to be used within the system with little or no software modification.

The host 12 may comprise any of a wide variety of different processor types including, for example, a general purpose microprocessor, a digital signal processor (DSP), a reduced-instruction set computer (RISC), a complex instruction set computer (CISK), a field programmable gate array (FPGA), and/or others, including multi-processor arrangements. In at least one approach, the host 12 includes a tightly-coupled processor complex that executes its own operating system. The end nodes 14 are each processing elements that may perform specific processing tasks within the domain 10. Each end node 14 may include, for example, a separate processor board or card that is inserted into a socket of a corresponding backplane structure. Other arrangements are also possible. The types of end nodes 14 that are present within a particular processing domain will typically depend upon the specific applications being implemented. Some possible end node types include, for example, network interface cards (NICs), storage interface cards, and other intelligent and/or non-intelligent input/output (I/O) devices.

Communication through the switching fabric 16 of processing domain 10 is packet-based. That is, information is transferred between the processing nodes using individual information packets. Each packet will typically identify the destination node of the packet. In one possible approach, each processing node within the domain 10 is assigned a unique node identification number. The identification number of a corresponding destination node is then included within each packet transmitted by a source node within the domain. FIG. 2 is a diagram illustrating one possible packet structure that may be used within the domain 10 of FIG. 1. As illustrated, a packet 22 includes a packet header field 24 to carry packet header information, a local ID (LID) field 26 to carry an LID, and a packet trailer field 28 to carry packet trailer information. The packet header and the packet trailer information identify, among other things, the beginning and end of the packet 22. The LID identifies the destination node of the packet 22 within the domain 10. The packet 22 will also typically include other fields such as, for example, a payload field to carry user data associated with the packet 22.

The local switches 18 each include multiple input/output ports (labeled 0–3 in FIG. 1) for inputting and outputting packets. A local switch 18 will receive a packet at one of its ports and then route the packet to another port (i.e., for output) based on the destination information within the packet. A lookup table (LUT) or other routing information may be employed within the local switch 16 to facilitate the routing function. The LUT within a particular local switch 18 may list, for example, all of the processing nodes 12, 14 within the domain 10 and indicate an appropriate port of the switch 18 for each listed node. When a packet is received by a local switch 18, the switch 18 determines the destination node of the packet and then consults the LUT to identify the appropriate output port for the packet. The packet is then routed out of the identified port. A packet may require routing through multiple local switches 18 before reaching a destination node. FIG. 3 is a diagram illustrating a pair of LUTs 30, 32 that may be used within the corresponding local switches (S1, S2) 18 of domain 10.

In one possible approach, a single physical memory map is used to describe the resources within the domain 10. This may be the case within, for example, a PCI legacy system. In this type of system, the routing can be performed based on the physical memory addresses within the memory map (i.e., instead of a node ID based approach). A content addressable memory (CAM) may be used in place of the routing LUT to perform this type of routing. That is, the CAM can route physical memory regions to particular nodes in the topology. Other packet routing techniques are also possible within the local switches 18.

FIG. 4 is a block diagram illustrating a multiple-domain processing system 40 in accordance with an embodiment of the present invention. As illustrated, the multiple-domain processing system 40 includes four individual processing domains (D1, D2, D3, D4) that each include a corresponding host 42 and corresponding end nodes 44. In addition, the multiple-domain processing system 40 includes a two-dimensional switching fabric 46 that is operative within two orthogonal routing planes (i.e., one local plane and one global plane) for routing packets between processing nodes 42, 44 in the system. As will be discussed in greater detail, the switching fabric 46 is capable of providing both intra-domain and inter-domain peer-to-peer communication within the processing system 40. The two-dimensional switching fabric 46 includes a number of local switches 48 to perform local routing duties for the corresponding processing domains and at least one global switch 50 to perform global routing duties between domains. In at least one embodiment of the invention, local and global switches within a system are implemented on a common semiconductor chip. Many alternative arrangements are also possible. As will be appreciated, the number of domains and the number and configuration of the switches 48, 50 within the switching fabric 46 may vary from design to design.

Figure 5:
FIG. 5 is a diagram illustrating a packet structure that may be used within the multiple-domain processing system of FIG. 4.

In the multiple-domain processing system 40 of FIG. 4, information packets will each include an indication of the destination domain of the packet as well as an indication of the destination node within the destination domain. FIG. 5 is a diagram illustrating one possible packet structure that may be used within the multiple-domain processing system 40 to provide these indications. As illustrated, the packet 54 includes a packet header field 56, an LID field 58, and a packet trailer field 64 that are similar to those discussed previously. In addition, the packet 54 also includes a global ID (GID) field 60 and a local/global flag field 62. The GID field 60 of the packet 54 includes a unique GID number identifying the destination domain of the packet 54. The local/global flag field 62 includes a flag indicating whether the packet 54 is to be delivered locally (i.e., within the local plane) or globally (i.e., within the global plane). Instead of providing a separate field 62 for the local/global flag, the flag can be implemented as a special encode within an existing field. The LID field 58 includes an LID number that identifies the destination node within the associated destination domain. It should be appreciated that many alternative methods for providing destination-related information within individual packets are also possible.

The manner in which a local switch 48 handles a received packet will depend upon whether the packet requires intra-domain routing or inter-domain routing. In at least one embodiment, the local switches 48 each include both local routing information (e.g., a local LUT) and global routing information (e.g., a global LUT). The local switches 48 may also include functionality (e.g., a selection unit) for selecting either the local routing information or the global routing information for use in routing a received packet, based on information within the received packet. When a local switch 48 receives a packet from a local processing node 42, 44, the switch 48 first reads information within the packet (e.g., a local/global flag, etc.) to determine whether local or global routing is to be performed. If the information indicates local routing, the local switch 48 reads destination node information (e.g., an LID number) in the packet and then consults the local routing information to determine an appropriate output port for the packet. The packet is then routed accordingly. If the packet then arrives at another local switch 48, the above process is repeated. The packet is eventually delivered to the local destination node identified within the packet.

If the packet indicates that global routing is to be performed, the local switch 48 consults the global routing information to determine the appropriate output port for the packet and the packet is routed accordingly. This process is repeated for each subsequent local switch 48 until the packet is delivered to a global switch 50. The global switch 50 then reads destination domain information (e.g., a GID number) within the packet and consults global routing information (e.g., a global LUT) stored within the switch 50 to identify an output port corresponding to the destination domain. The packet is then routed out of the identified port. The packet may subsequently be directed through one or more additional global switches 50 before being received within a local switch 48 in the destination domain.

As in the originating domain, the local switch 48 in the destination domain reads information within the received packet to determine whether routing is to be performed in the local plane or the global plane. In a system that uses local/global flags, the flag within a packet can be changed from "global" to "local" while the packet is in transit between the domains. This will preferably be performed within the first global switch 50 to receive the packet (e.g., within a toggle unit in the switch). After the local switch 48 determines that local routing is to be performed for the packet, it reads the destination node information of the packet and then consults its local routing information to determine an appropriate output port. The packet is then routed accordingly. The packet may then be routed through one or more additional local switches 48 before reaching the destination node.

It should be appreciated that information other than a local/global flag may be used to determine whether a packet is to be delivered within the local plane or the global plane. For example, in one approach, a local switch 48 reads the GID field of a received packet and compares the GID number therein to the known GID of the corresponding domain (which may be stored within a memory in the local switch 48). If the GIDs are the same, the local switch 48 determines that routing is to be performed in the local plane and consults its local routing information to route the packet. If the GIDs are different, the local switch 48 determines that routing is to be performed in the global plane and consults its global routing information to route the packet. This approach dispenses with the need to change the local/global flag during transfer between domains. Other techniques are also possible.

Figure 6:
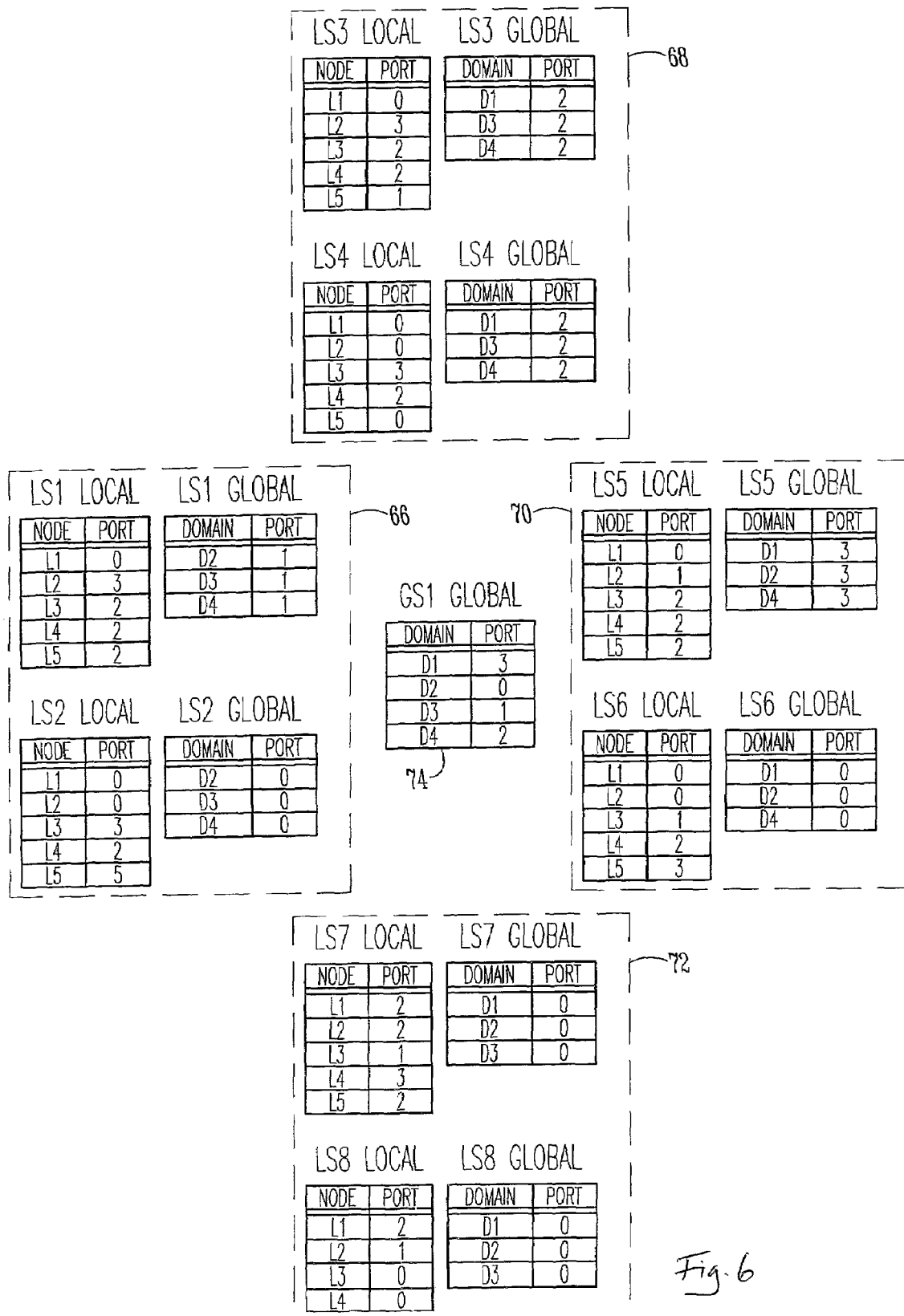
FIG. 6 is a diagram illustrating a set of local and global lookup tables that may be used within the switches of the multiple-domain processing system of FIG. 4.

FIG. 6 is a diagram illustrating a set of local and global LUTs that may be used within the switches 48, 50 of the two-dimensional switching fabric 46 of FIG. 4. A first group of LUTs 66 corresponds to local switches LS1 and LS2 in domain D1, a second group of LUTs 68 corresponds to local switches LS3 and LS4 in domain D2, a third group of LUTs 70 corresponds to local switches LS5 and LS6 within domain D3, and a fourth group of LUTs 72 corresponds to local switches LS7 and LS8 within domain D4. As shown, each local switch 48 in each domain includes both a local LUT and a global LUT. These LUTs may be stored, for example, within dedicated memory space within the corresponding switches 48. A global LUT 74 is also provided for the global switch (GS1) 50 of FIG. 4. In at least one approach, routing within the local switches of the two-dimensional switching fabric 46 is performed using memory address based routing techniques.

As described previously in connection with domain 10 of FIG. 1, it may be desirable to have the switching fabric associated with a domain mimic the attributes of a legacy interconnect solution (e.g., PCI bus) to maintain software transparency. When implementing a multi-dimensional switching fabric in accordance with the present invention (e.g., switching fabric 46 of FIG. 4), it is possible to maintain this software transparency within each individual domain of a multiple-domain system, thus allowing re-use of existing interconnect infrastructure (e.g., PCI infrastructure). Such an approach permits a gradual migration to extended solutions (e.g., multiple domain solutions) without requiring a complete abandonment of existing infrastructure.

In one aspect of the present invention, enumeration within a multiple-domain processing system having a hierarchical switching fabric (e.g., multiple-domain processing system 40 of FIG. 4) is performed as a multi-stage process. In an initial stage (i.e., the local enumeration stage), each domain in the multi-domain system is enumerated individually. In a subsequent stage (i.e., the global enumeration stage), enumeration is performed on a global basis. Enumeration is typically performed by transmitting configuration packets to the various nodes within the system in a discovery mode. During the local enumeration stage, the host within each domain may transmit configuration packets to "discover" the various end nodes within the domain. That is, the host may deliver configuration packets to each possible end node location within the domain and, if an end node is present at that location, the end node will deliver information back to the host that indicates the identity and/or capabilities of the end node. The host then assembles the information received from each of the local end nodes. The assembled information may then be used to generate local routing information (e.g., local LUTs) for each of the local switches in the domain. After the local switches have been initialized with local routing information, peer-to-peer communications (e.g., load/store) can commence within each domain.

The configuration packets utilized during the local enumeration stage will each typically include some indication that they are local packets (e.g., if a local/global flag is being used, it will indicate local routing). In at least one implementation, some or all of the global switches 50 within a multi-dimensional switching fabric will include a filter to block local packets. During the local enumeration stage, this will prevent interference caused by configuration packets from other domains. If local/global flags are used, the filter may simply read the flag of each incoming packet and drop any packet that indicates that it is local. In another possible technique, the switches within a domain can be connected through a root port that is tagged in some fashion (e.g., using pin strapping). In this arrangement, the global switches within the system can be identified by the absence of a root port. Other techniques for preventing interference between domains during local enumeration are also possible.

After local enumeration has completed, a global enumeration stage is commenced. To perform global enumeration, one of the hosts within the system will typically be designated as a system manager. The system manager may be selected, for example, using an arbitration protocol implemented in software before or during the global enumeration stage. During global enumeration, a discovery process is performed across domains. In one approach, the system manager transmits configuration packets throughout the multiple-domain system to discover the other domains in the system (note that other communication mechanisms, such as simple messaging protocol, could alternatively be used for this purpose). The configuration packets used during the global enumeration stage will each typically include some indication that they are global packets (e.g., if a local/global flag is used, it will indicate global routing). Hosts in other domains receive the global configuration packets and, in response, deliver information back to the system manager that relates to available processing nodes within the corresponding domains (i.e., information assembled during the previous local enumeration stage). The system manager then assembles the information from each discovered domain. The assembled information may subsequently be used to develop global routing information (e.g., global LUTs) for the local and global switches in the system. Information may also be delivered to the individual end nodes within each domain indicating the availability, capabilities, and/or locations of other processing nodes within the system that the end node may have use for in the future. After all switches have been properly initialized with global routing information, inter-domain peer-to-peer communications (e.g., load/store, message passing, etc.) may commence within the system.

During the local enumeration stage described above, it is possible to utilize legacy enumeration techniques within the individual domains. As described previously, this may allow the use of existing software to perform the local enumeration. In one possible approach, for example, PCI-compatible enumeration techniques are used to perform the local enumeration. Using these techniques, each port within a switch in a particular domain is viewed as a unique PCI bus transparent bridge device residing on its own unique bus segment. A discovery process is initiated and each discovered device is incorporated into a single memory map of the corresponding domain. At the completion of the process, memory map assignments are established and LUTs (or CAMs) are initialized for proper local routing. Due to the number of bus segments that are supported by PCI, the domain topology may be limited to a maximum of 256 nodes using this technique.

Figure 7:
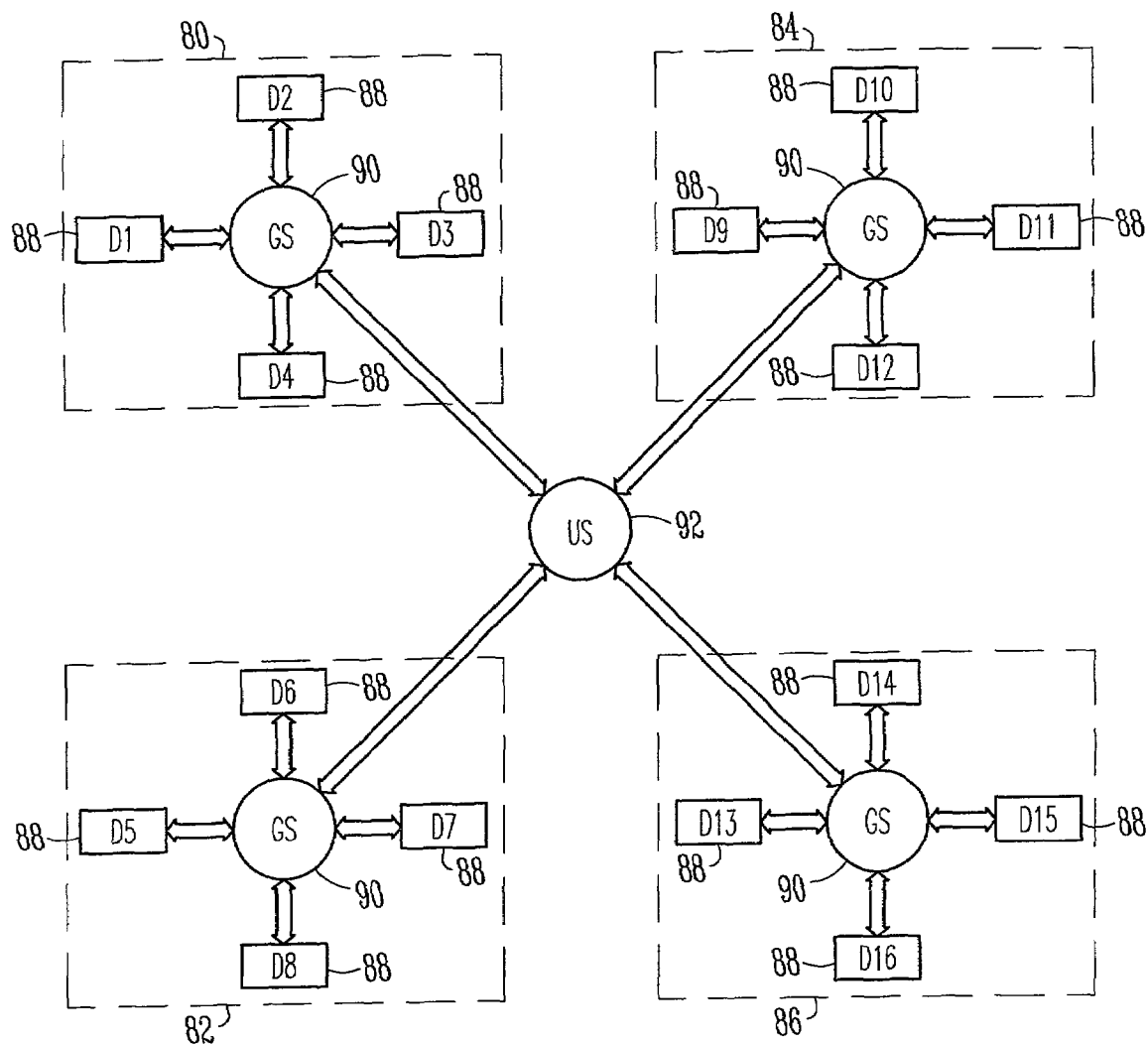
FIG. 7 is a block diagram illustrating a multiple-domain processing system that includes a multi-dimensional switching fabric having three orthogonal hierarchical planes in accordance with an embodiment of the present invention.

In at least one embodiment of the present invention, a multi-domain processing system is provided that includes a multi-dimensional switching fabric that has three or more orthogonal hierarchical planes. Such an approach may be used, for example, to provide communication between processing nodes within two or more multi-domain processing sub-systems. FIG. 7 is a block diagram illustrating one such embodiment. As shown, a number of two-dimensional multi-domain processing sub-systems 80, 82, 84, 86 are provided that are each similar to the system 40 of FIG. 4. That is, each sub-system 80, 82, 84, 86 comprises a number of processing domains 88 that each include a host and one or more end nodes (not shown). The processing domains 88 within each sub-system 80, 82, 84, 86 are able to communicate within one another through a switching fabric that includes local switches (which are assumed to be within the domains 88 in FIG. 7) and at least one global switch 90. In addition to the above, one or more universal switches 92 are provided to support communication between the different processing sub-systems 80, 82, 84, 86. This adds a third orthogonal plane to the switching fabric of the overall system. As will be appreciated, the number of sub-systems, the number of domains within each sub-system, and the number and configuration of the local, global, and universal switches within the switching fabric may vary from design to design.

To support the topology of FIG. 7, techniques similar to those described above may be implemented. For example, each packet in the system may include an indication of the destination sub-system (e.g., a universal ID (UID)), an indication of the destination domain within the destination sub-system (e.g., a GID), and an indication of the destination node within the destination domain of the destination sub-system (e.g., an LID). One or more flags may also be present in the packets to indicate which plane the packet is to be routed within (i.e., local, global, or universal). A universal LUT may be added to each global switch 90 in the system to support routing in the universal plane. A universal LUT may also be added to each local switch in the system. When a packet is received by a global switch 90, the switch 90 may first determine a plane within which the received packet is being routed (e.g., by reading a flag, etc.) and then consult routing information (e.g., an LUT) within the switch that is associated with the identified plane. The universal switch 92 will read destination sub-system information (e.g., a UID) within each received packet and route the packet based on universal routing information therein (e.g., a universal LUT). The universal switch 92 may also change a flag (or other information) within the packet to reflect an impending change in the routing plane of the packet. Additional orthogonal routing planes (e.g., a fourth plane, a fifth plane, etc.) can be added to a processing system in a manner similar to that described above.

The principles of the present invention can be used in a variety of different applications. In one possible application, for example, the inventive principles are used in a multi-processing environment to provide a system of loosely-coupled processing domains that each include a tightly-coupled hierarchical processor complex. As used herein, the term "tightly-coupled" refers to processors that share a common memory space and the term "loosely-coupled" refers to processors that do not share a common memory space. In another possible application, the inventive principles are used to provide redundant systems (e.g., multiple processor complexes) within a common chassis for, for example, embedded applications (e.g., CompactPCI® (cPCI)). In yet another application, the inventive principles are used to provide a distributed, loosely-coupled, multi-processing system within, for example, a cPCI backplane. In still another application, the inventive principles are implemented within a server environment (e.g., an I/O processor and/or intelligent I/O device) to provide communication between processors within multiple server processor boxes. As will be appreciated, many additional applications also exist.

Although the present invention has been described in conjunction with certain embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. A multiple-domain processing system, comprising:
   a first processing domain including a first plurality of processing nodes having a first host processor and at least one first end node;
   a second processing domain including a second plurality of processing nodes having a second host processor and at least one second end node; and
   a multi-dimensional switching fabric coupled to said first processing domain and said second processing domain to provide peer-to-peer packet communication within said processing system on multiple orthogonal routing planes, a first plane providing all of the routing for intra-domain packet communication between any two or more processing nodes included in the first plurality of processing nodes, and separately providing all of the routing for intra-domain packet communication between any two or more processing nodes included in the second plurality of processing nodes, and a second plane providing all of the routing for inter-domain packet communication between the first processing domain and the second processing domain.

2. The multiple-domain processing system of claim 1, wherein:
said first host processor includes a tightly-coupled processor complex.

3. The multiple-domain processing system of claim 2, wherein:
said first and second processing domains are loosely-coupled.

4. The multiple-domain processing system of claim 1, wherein:
said multi-dimensional switching fabric includes at least one local switch associated with said first processing domain, at least one local switch associated with said second processing domain, and at least one global switch to provide packet communication between said first and second processing domains.

5. The multiple-domain processing system of claim 4, wherein:
said at least one local switch associated with said first processing domain includes local packet routing information and global packet routing information.

6. The multiple-domain processing system of claim 5, wherein:
said local packet routing information includes a local lookup table and said global packet routing information includes a global lookup table.

7. The multiple-domain processing system of claim 5, wherein:
said local packet routing information includes memory map information and said global packet routing information includes a global lookup table.

8. The multiple-domain processing system of claim 5, wherein:
said at least one local switch associated with said first processing domain selects, based on information within a received packet, either the local packet routing information or the global packet routing information for use in routing the received packet.

9. The multiple-domain processing system of claim 8, wherein:
said information within said received packet includes a local/global flag.

10. The multiple-domain processing system of claim 8, wherein:
said information within said received packet includes packet destination information.

11. The multiple-domain processing system of claim 4, wherein:
said at least one global switch includes global packet routing information for use in routing a received packet based on destination domain information within the received packet.

12. The multiple-domain processing system of claim 1, wherein:
said first host processor includes a packet generator to generate a packet for delivery to a destination node that includes information identifying a domain of the destination node.

13. The multiple-domain processing system of claim 1, wherein:
said first host processor includes a packet generator to generate a packet for delivery to a destination node that includes information identifying a plane within the multi-dimensional switching fabric in which the packet is to be routed.

14. A system comprising:
a plurality of processing subsystems, each processing subsystem including a plurality of processing domains; and
a multi-dimensional switching fabric coupled to each of the plurality of processing subsystems to provide peer-to-peer communication within the system on multiple orthogonal planes, including a first plane providing intra-domain communications, a second plane providing inter-domain communication within each of the plurality of processing subsystems, and a third plane providing communication among the plurality of processing subsystems.

15. The system of claim 14, wherein one or more of the plurality of processing domains comprises:
a first processing domain having a first host processor and at least one first end node; and
a second processing domain having a second host processor and at least one second end node.

16. The system of claim 15, wherein the first host processor comprises a tightly-coupled processor complex.

17. The system of claim 15, wherein the first processing domain and the second processing domain are loosely-coupled.

18. The system of claim 15, wherein the first host processor comprises a packet generator to generate a packet for delivery to a destination node that includes information identifying a domain of the destination node, and to generate a packet for delivery to a destination node that includes information identifying a plane within the multi-dimensional switching fabric in which the packet is to be routed.

19. The system of claim 14, wherein the multi-dimensional switching fabric comprises local routing information, global routing information, and universal routing information.

20. The system of claim 19, wherein the local routing information comprises a local lookup table, the global routing information comprises a global lookup table, and the universal routing information comprises a universal lookup table.

21. The system of claim 19, wherein the local routing information comprises memory map information, the global routing information comprises a global lookup table, and the universal routing information comprises a universal lookup table.

22. The system of claim 19, wherein the multi-dimensional switching fabric selects, based on information within a received packet, either the local routing information, the global routing information, or the universal routing information.

23. The system of claim 22, wherein the information within the received packet comprises a local/global/universal flag.

24. The system of claim 22, wherein the information within the received packet comprises packet destination information.

25. A method comprising:
receiving an information packet at a multi-dimensional switching fabric;
determining whether the information packet is to be transmitted on a first plane or a second plane; and
transmitting the information packet on the first plane or the second plane.

26. The method of claim 25, wherein receiving the information packet at the multi-dimensional switching fabric comprises receiving the information packet comprising an indication of a destination domain of the information packet and an indication of a destination node of the information packet.

27. The method of claim 25, wherein receiving the information packet at the multi-dimensional switching fabric comprises receiving the information packet including a local/global flag.

28. The method of claim 27, wherein transmitting the information packet on the first plane or the second plane comprises changing the local/global flag from a global indication to a local indication.

29. The method of claim 25, wherein determining whether the information packet is to be routed on the first plane or the second plane comprises using the information within the information packet.

30. The method of claim 25, wherein transmitting on the first plane comprises using a local routing information, and transmitting on the second plane includes using a global routing information.

31. The method of claim 25, wherein determining whether the information packet is to be transmitted on a first plane or a second plane further comprises:
    determining whether the information packet is to be routed on a third plane comprising using information within the information packet, and
    transmitting on the third plane comprising using a universal routing information.

* * * * *